United States Patent
Kalburgi

(10) Patent No.: US 11,349,735 B2
(45) Date of Patent: *May 31, 2022

(54) FASTER FAULT-DETECTION MECHANISM, FOR EXAMPLE USING BIDIRECTIONAL FORWARDING DETECTION (BFD), ON NETWORK NODES AND/OR HOSTS MULTIHOMED USING A LINK AGGREGATION GROUP (LAG)

(71) Applicant: Juniper Networks, Inc., Sunnyvale, CA (US)

(72) Inventor: Surya Prakash S. Kalburgi, Dublin, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,832

(22) Filed: Aug. 19, 2020

(65) Prior Publication Data

US 2020/0382394 A1 Dec. 3, 2020

Related U.S. Application Data

(63) Continuation of application No. 16/399,841, filed on Apr. 30, 2019, now Pat. No. 10,805,193.

(51) Int. Cl.
*G06F 11/00* (2006.01)
*H04L 43/0811* (2022.01)
*H04L 43/50* (2022.01)

(52) U.S. Cl.
CPC ......... *H04L 43/0811* (2013.01); *H04L 43/50* (2013.01)

(58) Field of Classification Search
CPC ..... H04L 43/0811; H04L 43/50; H04L 69/40; H04L 41/06; H04L 69/14; H04L 49/555;
(Continued)

(56) References Cited

U.S. PATENT DOCUMENTS 10,616,046 B2 * 4/2020 Wen ..................... H04L 41/08
10,805,193 B1 * 10/2020 Kalburgi .............. H04L 69/40
(Continued)

OTHER PUBLICATIONS

Communication pursuant to Article 94(3) EPC to corresponding European Patent Application No. 19181456.5-1215, dated Jul. 6, 2021 (6 pgs.).
(Continued)

*Primary Examiner* — Chuong T Ho
(74) *Attorney, Agent, or Firm* — John C. Pokotylo; Pokotylo Patent Services

(57) ABSTRACT

For use in a system including a first data forwarding device, a second data forwarding device, a third data forwarding device, a first communications link between the first data forwarding device and the second data forwarding device, and a second communications link between the first data forwarding device and the third data forwarding device, the first and second communications links belonging to a link aggregation group (LAG), a method includes (1) generating a message (i) for testing a first path between the first data forwarding device and the second data forwarding device, and a second path between the first data forwarding device and the third data forwarding device, and (ii) including an Internet protocol (IP) datagram including a multicast IP destination address and a payload containing path testing information; and (2) sending, over the LAG, the message from the first data forwarding device to both the second data forwarding device and the third data forwarding device. Responsive to receiving an instance of the message by either of the second or third data forwarding device, such device(s) (1) determine whether or not the received instance of the message is a fault detection on a multihomed link aggregation group message, and (2) processing the received instance of the message based on the determination of whether or not
(Continued)

it is a fault detection on a multihomed link aggregation group message.

20 Claims, 13 Drawing Sheets

(58) Field of Classification Search
CPC ....... H04L 45/28; H04L 45/22; H04L 45/245; H04L 12/4641; H04L 12/4633; Y02D 30/50
USPC .......................................................... 370/244
See application file for complete search history.

(56) References Cited

U.S. PATENT DOCUMENTS

| | | | | |
|---|---|---|---|---|
| 2011/0075554 A1* | 3/2011 | Holness | ................... | H04L 1/22 370/228 |
| 2012/0300773 A1* | 11/2012 | Maeda | ................. | H04L 61/103 370/390 |
| 2014/0133289 A1* | 5/2014 | Jadav | ................. | H04L 43/0811 370/216 |
| 2015/0207670 A1* | 7/2015 | Tatsumi | ................ | H04L 49/555 370/218 |
| 2015/0326309 A1* | 11/2015 | Lanzone | ................... | H04J 3/14 398/2 |
| 2016/0301597 A1* | 10/2016 | Jayakumar | ............ | H04L 45/245 |
| 2020/0382394 A1* | 12/2020 | Kalburgi | ............. | H04L 43/0811 |

OTHER PUBLICATIONS

Communication pursuant to Article 94(3) EPC to corresponding European Patent Application No. 19181456.5-1215, dated Dec. 15, 2021 (9 pgs.).
First Office Action to corresponding Chinese Patent Application No. 201910910069.0, dated Nov. 17, 2021 (5 pgs.) with English translation (5 pgs.).
Search Report to corresponding Chinese Patent Application No. 201910910069.0, dated Nov. 8, 2021 (3pgs.).

* cited by examiner

FASTER FAULT-DETECTION MECHANISM, FOR EXAMPLE USING BIDIRECTIONAL FORWARDING DETECTION (BFD), ON NETWORK NODES AND/OR HOSTS MULTIHOMED USING A LINK AGGREGATION GROUP (LAG)

§ 0. RELATED APPLICATION(S)

The present application is a continuation of pending U.S. patent application Ser. No. 16/399,841 (referred to as "the '841 application" and incorporated herein by reference), filed on Apr. 30, 2019, titled "FASTER FAULT-DETECTION MECHANISM, FOR EXAMPLE USING BIDIRECTIONAL FORWARDING DETECTION (BFD), ON NETWORK NODES AND/OR HOSTS MULTI-HOMED USING A LINK AGGREGATION GROUP (LAG)" and listing Surya Prakash S. Kalburgi as the inventor.

§ 1. BACKGROUND OF THE INVENTION

§ 1.1 Field of the Invention

The present description concerns communications networks. More specifically, the present description concerns detecting faults in communications networks, especially in communications networks having multihomed access, such as via Ethernet Virtual Private Network (EVPN) multihoming for example.

§ 1.2 Background Information

§ 1.2.1 Multihoming Examples and Technologies Supporting Multihoming

In an example datacenter environment within the cloud, one design consideration for network architects is that the networks be more resilient and fault tolerant. The desire for resiliency and fault tolerance spans across all or most segments of the cloud-based datacenter; from the host where applications are hosted, to a wide area network (WAN) peering with Internet.

In typical datacenter design, the end host is usually connected to multiple Top of Rack (TOR) nodes (also referred to as "leaf nodes") using Link-Aggregation-Group (LAG) bundles. This multihomed architecture provides fault-tolerant connectivity between the leaf nodes and the host in the event of a single-link failure as compared to single-homed host (in which the host is connected to just a single leaf node). Since it is desired to switch over any traffic from the failed link (between the host and one of the leaf nodes) to an available link (between the host and another of the left nodes) quickly, it is important to detect the fault (and to switch over) as quickly as possible.

Another example in which multihoming is useful is when a customer edge (CE) device is connected to two or more provider edge (PE) devices to provide redundant connectivity.

Some of the common implementations supporting multihomed network architectures include Ethernet Virtual Private Network (EVPN) Ethernet Segment Identifier (ESI) based multihoming and Multi-Chassis-LAG (MC-LAG). Although these technologies are understood, they are briefly introduced below for the reader's convenience.

Different modes of operation for multihoming include "single," "active-standby" and "active-active." When a device is connected to a single-homed device (or site), the mode of operation is "single." When only a single device among a group of devices (e.g., attached to an Ethernet segment) is allowed to forward traffic to and from another device (e.g., on that Ethernet segment), the mode of operation is the "active-standby" redundancy mode. Finally, when all (or at least multiple) devices of a group (e.g., attached to an Ethernet segment) are allowed to forward traffic to and from another device (e.g., on that Ethernet segment), the mode of operation is the "active-active" (e.g., load balanced) redundancy mode.

As just noted above, multihoming is useful is when a CE device is connected to two or more PE devices to provide redundant connectivity. An Ethernet Virtual Private Network (EVPN) may be used to support such a topology. For example, EVPN may include CE devices that are connected to PE devices, which form the edge of the multiprotocol label switching (MPLS) infrastructure (sometimes referred to as an MPLS transport network). A CE device can be a host, a router, or a switch. The PE devices provide Layer 2 virtual bridge connectivity between the CE devices. There can be multiple EVPNs in the provider's transport network. Learning between the PE routers occurs in the control plane using, for example, the border gateway protocol (BGP), unlike traditional bridging, where learning occurs in the data plane. The EVPN multihoming feature enables a network administrator to connect a customer site to two or more PE devices to provide redundant connectivity. A CE device can be multihomed to different PE devices or the same PE device. A redundant PE device can provide network service to the customer site as soon as a failure is detected. Thus, EVPN multihoming helps to maintain EVPN service and traffic forwarding to and from the multihomed site in the event of (a) PE device to CE device link failure, (b) PE device failure, and/or (c) MPLS-reachability failure between the local PE device and a remote PE device.

IEEE 802.3ad link aggregation enables network administrators to group Ethernet interfaces to form a single link layer interface, also known as a link aggregation group (LAG) or bundle.

Aggregating multiple links between physical interfaces creates a single, logical, point-to-point trunk link or a LAG. The aggregated Ethernet interfaces that participate in a LAG are called "member links." LAGs can be used to increase bandwidth, provide graceful degradation as failure occurs, and/or increase availability. LAGs can provide network redundancy by load-balancing traffic across all available links. If one of the links fails, the system automatically load-balances traffic across all remaining links. That is, since a LAG is composed of multiple member links, even if one member link fails, the LAG can continue to carry traffic over the remaining links.

The Link Aggregation Control Protocol (LACP), a component of IEEE 802.3ad, provides additional functionality for LAGs. More specifically, LACP can be used to ensure that both ends of the Ethernet link are functional and are members of the aggregation group before the link is added to the LAG. When LACP is configured, it detects misconfigurations on the local end or the remote end of the link. Thus, LACP can help to prevent communication failure.

One problem with standard link aggregation is that the connections are point to point. Multichassis link aggregation groups (MC-LAGs) enable a client device to form a logical LAG interface between two MC-LAG peers. An MC-LAG provides redundancy and load balancing between the two MC-LAG peers, multihoming support, and a loop-free layer 2 network without needing to run the spanning tree protocol (STP). On one end of an MC-LAG, there is an MC-LAG client device, such as a server, that has one or more physical links in a link aggregation group (LAG). This client device uses the link as a LAG. On the other side of the MC-LAG, there can be (e.g., a maximum of) two MC-LAG peers. Each of the MC-LAG peers has one or more physical links connected to a single client device.

The MC-LAG peers may use the Inter-Chassis Control Protocol (ICCP) to exchange control information and coordinate with each other to ensure that data traffic is forwarded properly. LACP may be used to discover multiple links from a client device connected to an MC-LAG peer.

§ 1.2.2 Limitations of Using the Link Aggregation Control Protocol (LACP) for Fault Detection In the current deployments, the Link Aggregation Control Protocol (LACP) is used as an operations, administration and management (OAM) protocol to detect and isolate any fault on the connected interfaces. Unfortunately, however, even with fastest timeout interval set on LACP, it takes about 3-5 seconds to detect the fault along the interface. Such a 3-5 second delay can lead to service degradation, which can impact end applications.

FIGS. 1A-1C illustrate an example datacenter environment 100 used to illustrate the foregoing problem. The example environment includes a datacenter having leaf nodes (L1-Ln) 120 which are connected with spine/core nodes (N1-Nm) 130 directly, or via a distribution layer 140 of nodes. Assume an EVPN ESI deployment in which (1) host H1 is connected to leaf node L1, (2) the leaf node L1 has EVPN peering with two other leaf nodes L2 and L3, and (3) host H2 is multihomed to L2 and L3 using LACP.

Referring to FIG. 1A, in a steady state with all links up, traffic from host H1 to host H2 gets load-balanced between leaf nodes L2 and L3 as indicated by the arrowed paths. Referring next to FIG. 1B, assume that the link between leaf node L3 and host H2 becomes faulty due to congestion or a state which impairs node from processing the packets. (Note that this can occur even if the physical link is UP. For example, in some cases, the physical link can be operational, but the OAM protocol can go down due to congestion, in which case the remote device is in a state in which OAM packets are not processed.) As a result, traffic from host H1 to host H2 that gets load-balanced on leaf node L3 would "blackhole" for at least 3-5 seconds until LACP detects the underlying problem and isolates the link from LAG bundles. This is also true for the traffic in reverse direction from host H2 to host H1, that gets load-balanced on H2 and sprayed across the links connected to leaf node L2 and leaf node L3. As shown in FIG. 1C, once LACP times out and isolates the faulty link, all of the traffic between host H1 and host H2 is now forwarded via leaf node L2.

In the foregoing scenario (and similar situations in which a device is multihomed to different nodes and LACP is used), a faster sub-second fault detection method is highly desired to enable quicker isolation of a faulty interface. Note that a "faulty interface" is intended to be interpreted broadly and include, for example, a fault in the line card associated with the interface, a fault in the physical link terminated by the interface, etc. In this context the faulty interface relates to a state when the traffic on the interface in either of the direction gets corrupted or dropped due to multiple issues but not limited to common scenarios like data transmission, impaired state on leaf nodes or host nodes, or congestion. Thus, if the faulty interface is detected and isolated within sub-seconds, all (or most) traffic from host H1 to host H2 and vice-versa would be diverted through leaf node L2 without any (or with minimal) visible impact on the services and applications.

§ 1.2.3 Using Bidirectional Forwarding Detection (BFD) for Faster Fault Detection The document "Bidirectional Forwarding Detection (BFD)," Request for Comments 5880 (Internet Engineering Task Force, June 2010) (referred to as "RFC 5880" and incorporated herein by reference) notes that the use of protocol "Hellos" to detect a failure in the path between two routing protocol engines is too slow in certain situations. RFC 5880 describes a method for providing low-overhead, short-duration detection of failures in the path between adjacent forwarding engines (including the interfaces, data link(s), and, to the extent possible, the forwarding engines themselves).

Per RFC 5880, BFD is designed to detect failures in communication with a forwarding plane next hop. It is intended to be implemented in some component of the forwarding engine of a system, in cases where the forwarding and control engines are separated. BFD may also be implemented in the control engine, though doing so may preclude the detection of some kinds of failures. BFD operates on top of any data protocol (network layer, link layer, tunnels, etc.) being forwarded between two systems. It is always run in a unicast, point-to-point mode. (Consequently, the current implementation of BFD is not useful, or at least not specified, for multihomed connections.) BFD packets are carried as the payload of whatever encapsulating protocol is appropriate for the medium and network. BFD may be running at multiple layers in a system and the context of the operation of any particular BFD session is bound to its encapsulation. BFD can provide failure detection on any kind of path between systems, including direct physical links, virtual circuits, tunnels, MPLS Label Switched Paths (LSPs), multihop routed paths, and unidirectional links (provided some return path exists). Multiple BFD sessions can be established between the same pair of systems when multiple paths between them are present in at least one direction, even if a lesser number of paths are available in the other direction.

Per RFC 5880, the BFD state machine implements a three-way handshake, both when establishing a BFD session and when tearing it down for any reason, to ensure that both systems are aware of the state change. BFD can be abstracted as a simple service. The service primitives provided by BFD are to create, destroy, and modify a session, given the destination address and other parameters. BFD in return provides a signal to its clients indicating when the BFD session goes up or down.

More specifically, per RFC 5880, BFD is a simple Hello protocol that, in many respects, is similar to the detection components of well-known routing protocols. A pair of systems transmit BFD Echo and/or BFD Control packets (referred to more generally as "BFD packets") periodically over each path between the two systems. If a system stops receiving BFD packets for a long enough time period, some component in that particular bidirectional path to the neighboring system is assumed to have failed. Under some conditions, systems may negotiate not to send periodic BFD packets in order to reduce overhead. A path is only declared to be operational when two-way communication has been established between systems, though this does not preclude the use of unidirectional links. As noted above, a separate BFD session may be created for each communications path and data protocol in use between two systems.

Per RFC 5880, each system estimates how quickly it can send and receive BFD packets in order to come to an agreement with its neighbor (also referred to as "peer") about how rapidly detection of failure will take place. These estimates can be modified in real time in order to adapt to unusual situations. This design also allows for fast systems on a shared medium with a slow system to be able to more rapidly detect failures between the fast systems while allowing the slow system to participate to the best of its ability.

The document, "Bidirectional Forwarding Detection (BFD) for IPv4 and IPv6 (Single Hop)," Request for Comments 5881 (Internet Engineering Task Force, June 2010) (referred to as "RFC 5881" and incorporated herein by reference) describes using BFD to track IPv4 and IPv6 connectivity between directly connected systems. It describes the encapsulation of BFD control packets within User Datagram Protocol (UDP) packets, which are transmitted in IPv4 or IPv6 packets.

Presently (early 2019), BFD is a very popular OAM protocol due to its ease of operation. As noted, BFD relies on plain IP/UDP, which works across all protocols.

§ 1.2.4 Using BFD for Fault Detection on a Per Link Basis in a Link Aggregation Group (LAG) Bundle The document "Bidirectional Forwarding Detection (BFD) on Link Aggregation Group (LAG) Interfaces," Request for Comments 7130 (Internet Engineering Task Force, February 2014) (referred to as "RFC 7130" and incorporated herein by reference) describes enabling BFD on a per-link basis in an LAG bundle. RFC7130 specifies that a destination IP address must be configured on the peer and should be reachable through the LAG interface, but does not provide any clarity on the specifics of destination IP address, thereby permitting different implementations. Consequently, BFD on LAG as per RFC 7130 would not be suitable for a LAG deployment in a multihomed environment, such as the one discussed above with reference to FIGS. 1A-1C (since the two (leaf) nodes would have two different destination IP addresses).

These limitations and/or requirements of RFC 7130 shortcomings cause a number of problems. First, different equipment vendors have different implementations regarding the destination IP address. This raises the need for specific configuration(s) to enable interoperability between different equipment vendors. Second, any change in the IP address would require relevant configuration changes across all participating nodes. Third, in a multihomed LAG (such as, for example, the one illustrated in FIGS. 1A-1C), the destination IP address can't be same for all the links because each link would terminate on different (e.g., leaf) nodes, and such different nodes don't necessarily have same IP address configured. A similar problem occurs for a CE device multihomed (e.g., with a LAG) to PE devices at the edge of a provider transport network.

Thus, it would be useful to detect faults more quickly (e.g., more quickly than 3-5 seconds as in LACP, and preferably with sub-second timing), especially in multihomed environments, and especially in MC-LAGs.

§ 2. SUMMARY OF THE INVENTION

For use in a system including a first data forwarding device, a second data forwarding device, a third data forwarding device, a first communications link between the first data forwarding device and the second data forwarding device, and a second communications link between the first data forwarding device and the third data forwarding device, the first and second communications links belonging to a link aggregation group (LAG), an example method consistent with the present description includes (1) generating a message (i) for testing a first path between the first data forwarding device and the second data forwarding device, and a second path between the first data forwarding device and the third data forwarding device, and (ii) including an Internet protocol (IP) datagram including a multicast IP destination address and a payload containing path testing information; and (2) sending, over the LAG, the message from the first data forwarding device to both the second data forwarding device and the third data forwarding device.

Responsive to receiving an instance of the message by either of the second or third data forwarding device, such device(s) (1) determine whether or not the received instance of the message is a fault detection on a multihomed link aggregation group message, and (2) processing the received instance of the message based on the determination of whether or not it is a fault detection on a multihomed link aggregation group message.

In some such example methods, the message is carried in an Ethernet frame. The Ethernet frame may include a multicast destination media access control (MAC) address. For example, the MAC address may be 01-00-5E-90-00-01.

In some such example methods, the path testing information in the payload of the message includes at least one of (A) a bidirectional forwarding detection (BFD) control packet compliant with RFC 5880 or (B) a BFD echo packet compliant with RFC 5880. In some such example methods, the path testing information in the payload of the message includes at least one of (A) a bidirectional forwarding detection (BFD) control packet compliant with RFC 7130 or (B) a BFD echo packet compliant with RFC 7130.

In some such example methods, the act of testing the message for compliance with the path testing procedure includes checking the destination IP address of the message.

In some such example methods, the path testing information in the payload of the message includes at least one of (A) a bidirectional forwarding detection (BFD) control packet compliant with RFC 5880 or (B) a BFD echo packet compliant with RFC 5880, and the path testing procedure is bidirectional forwarding detection in accordance with RFC 5880.

In some such example methods, the path testing information in the payload of the message includes at least one of (A) a bidirectional forwarding detection (BFD) control packet compliant with RFC 5880 or (B) a BFD echo packet compliant with RFC 5880, and the path testing procedure is bidirectional forwarding detection in accordance with RFC 7130.

Any of the foregoing example methods may be implemented on a data forwarding device, such as a router for example.

Any of the foregoing example methods may be stored as processor-executable instructions on a non-transitory computer-readable storage medium.

§ 3. BRIEF DESCRIPTION OF THE DRAWINGS

§ 4. DETAILED DESCRIPTION

The present description may involve novel methods, apparatus, message formats, and/or data structures for detecting faults more quickly (e.g., more quickly than 3-5 seconds as in LACP, and preferably with sub-second timing), especially in multihomed environments, and especially in MC-LAGs. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

§ 4.1 Example Method(s)

Figure 1A:
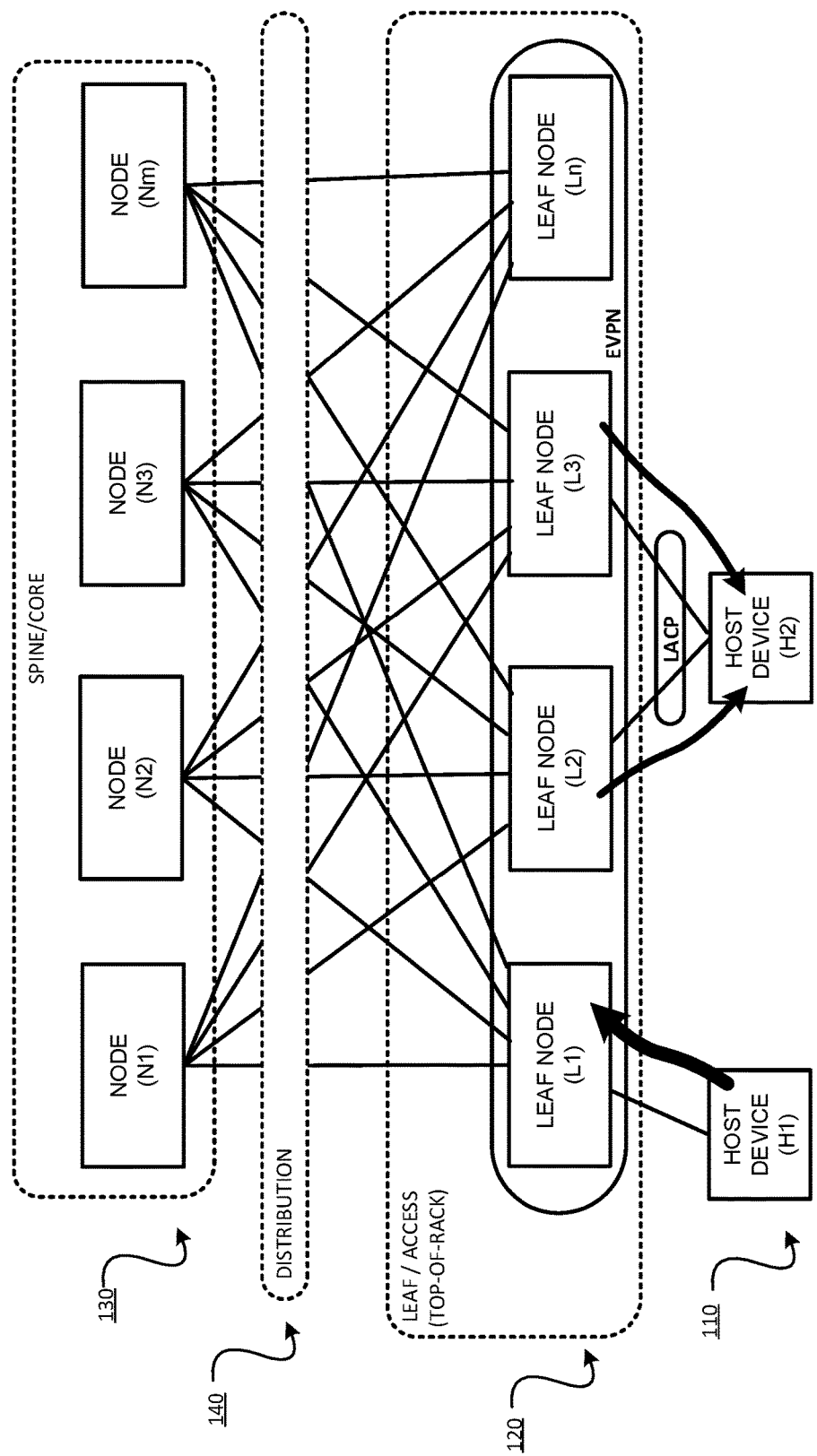
FIGS. 1A-1C illustrate an example datacenter environment used to illustrate the challenge of quickly detecting link failures in a multihomed environment, such as in a MC-LAG.
Figure 1B:
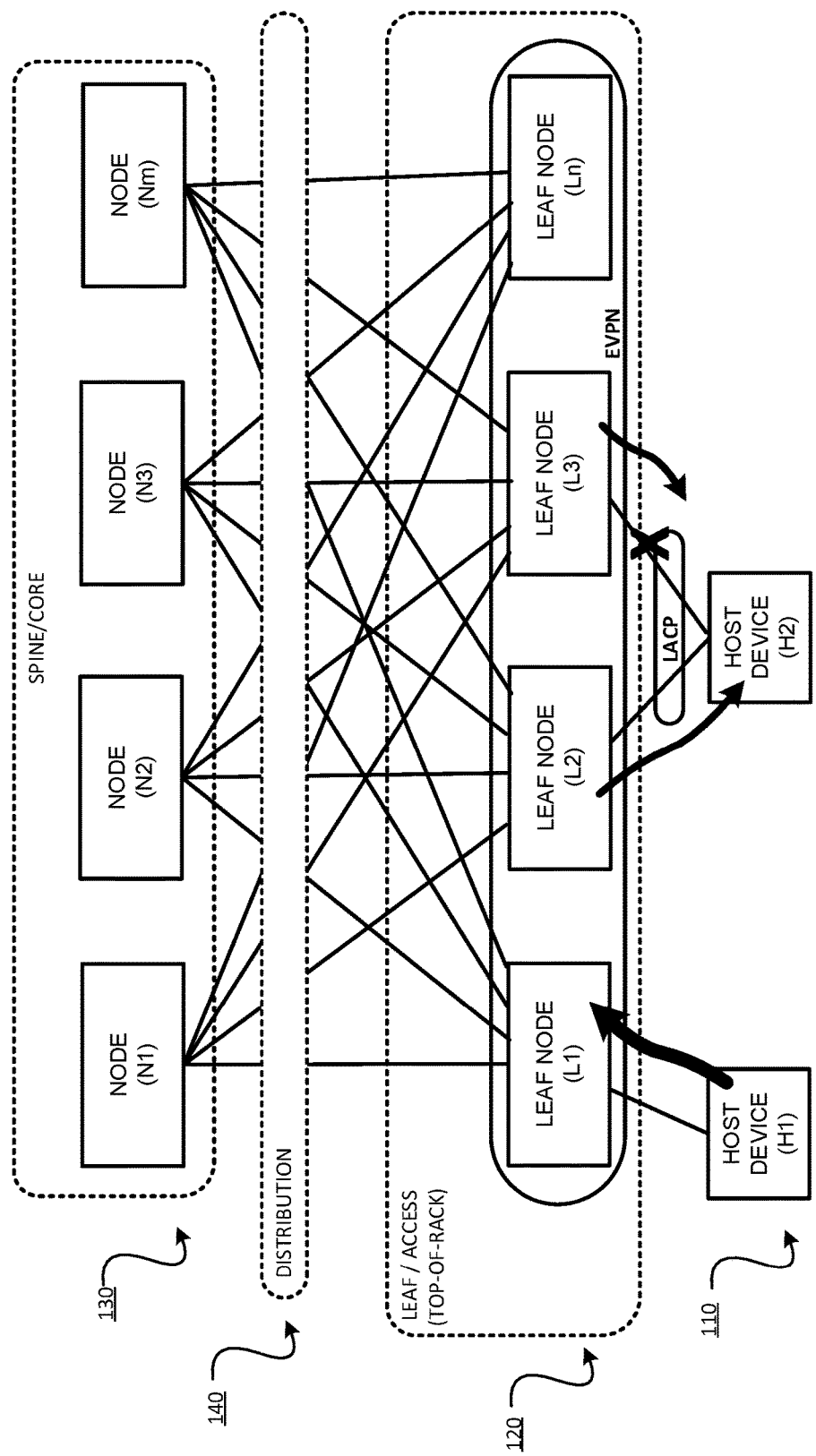
Figure 1C:
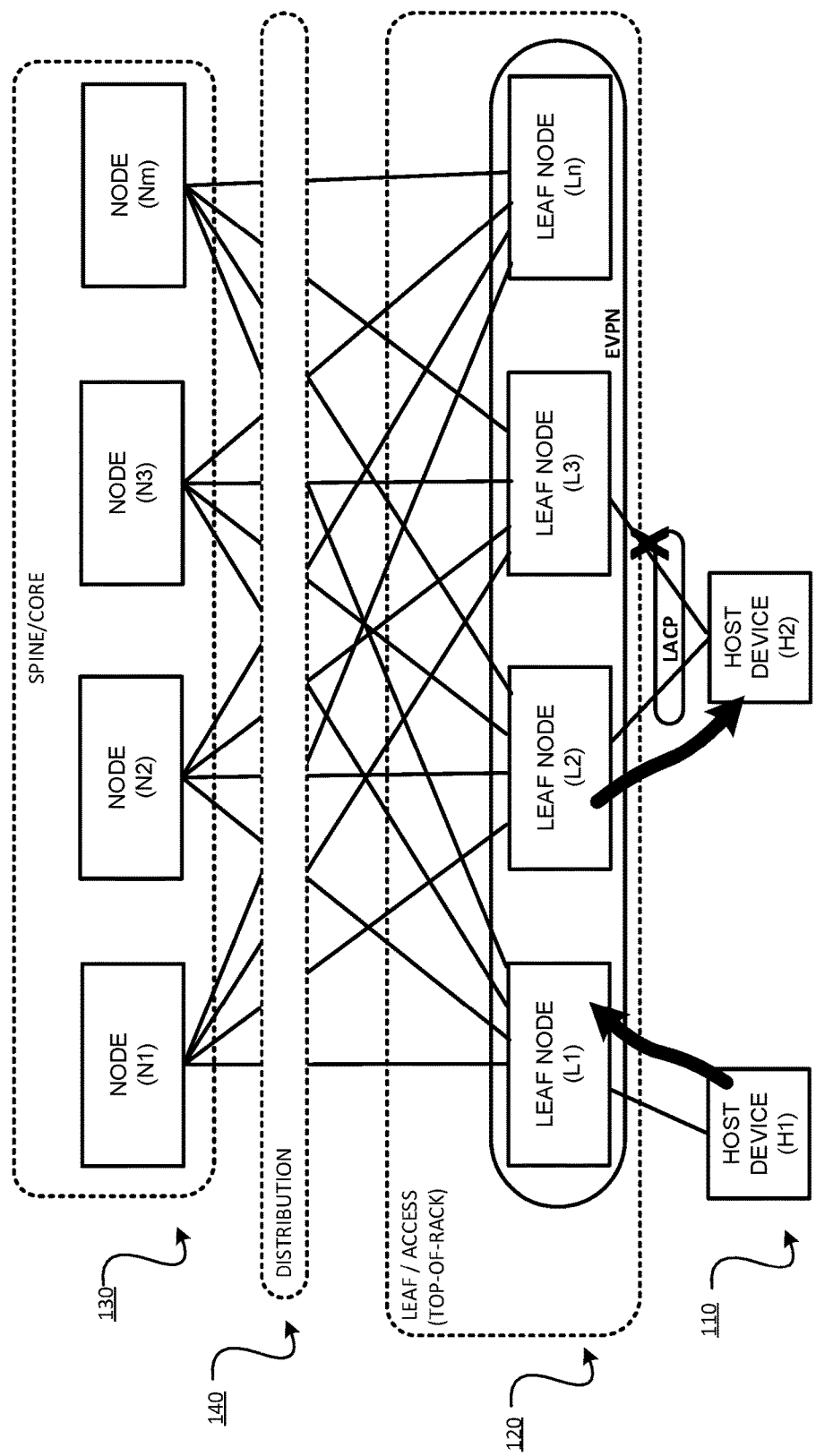
Figure 2:
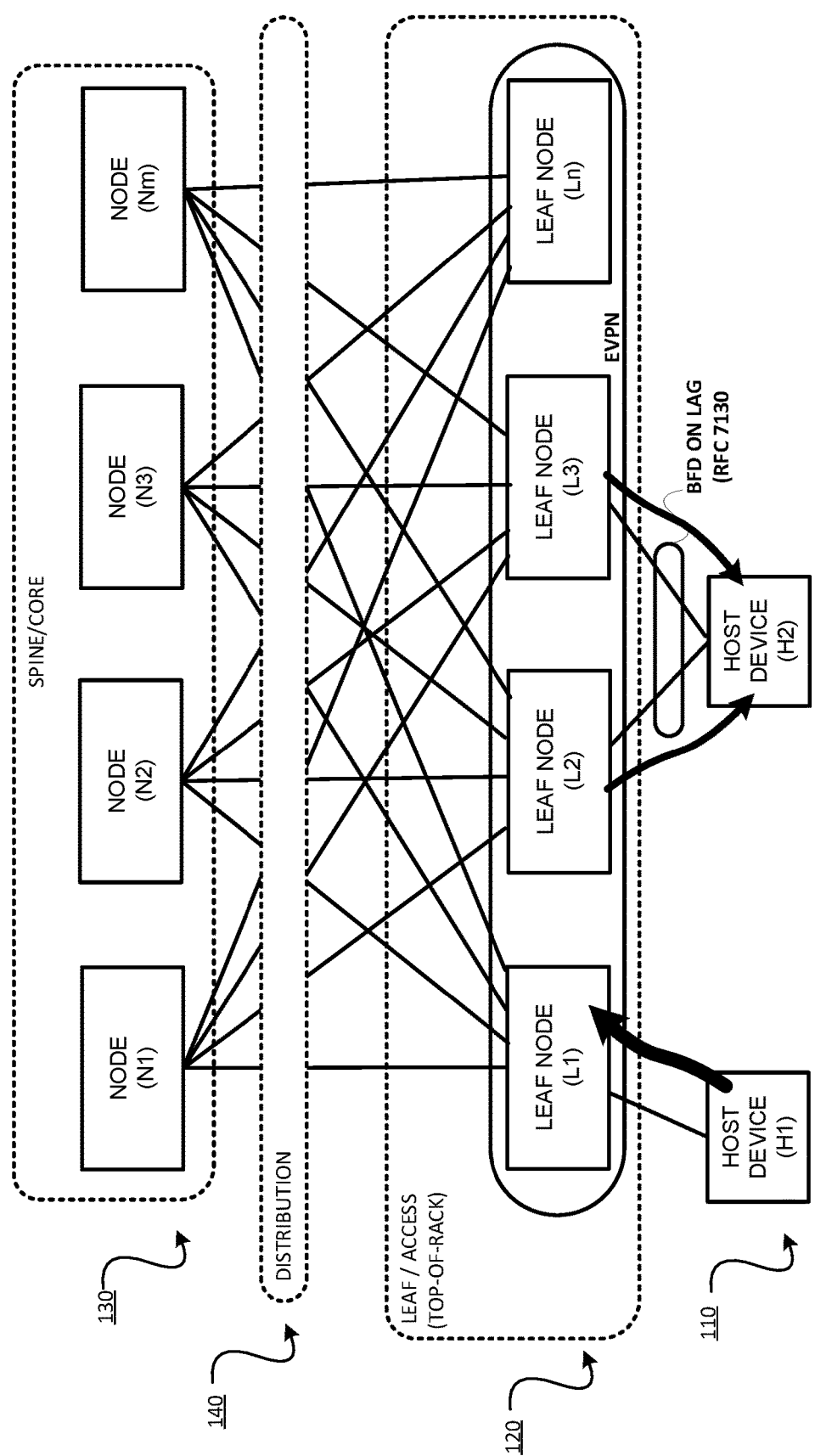
FIG. 2 illustrates a datacenter environment in which a technique compliant with RFC 7130 is used to check connectivity of a host device multihomed to leaf nodes of a datacenter.

FIG. 2 is an example environment 200, similar to that 100 of FIGS. 1A-1C, in which example methods consistent with the present description can be used. Note that host device H2 is multihomed to leaf nodes L2 and L3, and that the example methods may be used in accordance with (e.g., in compliance with) BFD on LAG per RFC 7130. Further, the links may belong to a LAG.

Figure 3:
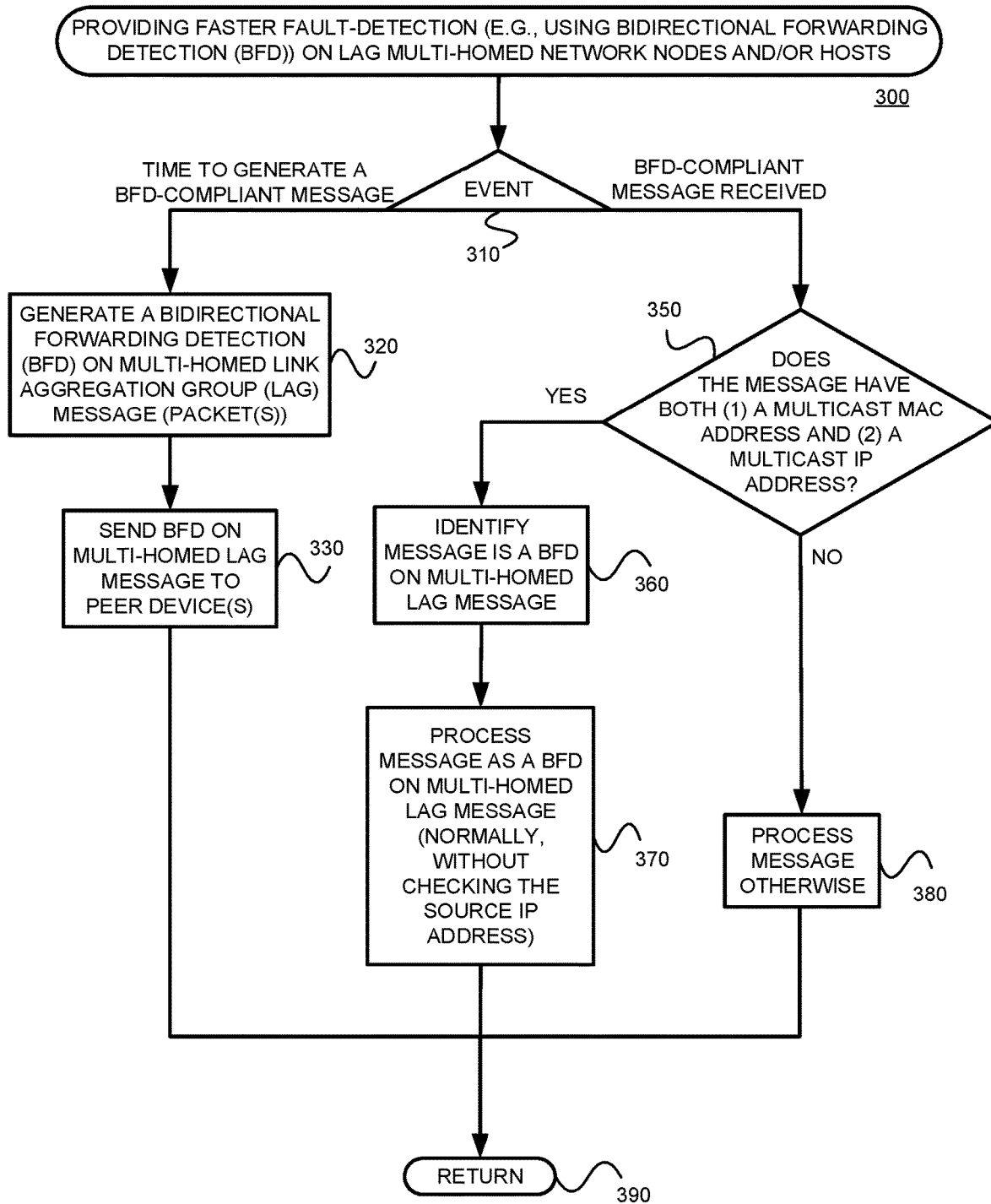
FIG. 3 is an example method for providing faster fault-detection (e.g., using bidirectional forwarding detection (BFD)) on multihomed network nodes and/or hosts using a LAG in a manner consistent with the present description.

FIG. 3 is an example method 300 for providing faster fault-detection (e.g., using bidirectional forwarding detection (BFD)) on network nodes and/or hosts multihomed using a LAG in a manner consistent with the present description. Different branches of the example method 300 are performed in response to the occurrence of different events. (Event branch point 310) Referring first to the left branch of the example method 300, in response to it being time to generate a fault detection protocol (e.g., BFD compliant) message (e.g., a BFD packet), the example method 300 may generate a fault detection (e.g., BFD) on multihomed LAG message (e.g., packet). (Block 320) If the fault detection protocol is to be BFD, the message should be compliant with RFC 7130. Example formats for this message are described in § 4.2 below, with reference to FIGS. 4 and 5. As described in more detail later, the message should have both (1) a multicast media access control (MAC) address and (2) a multicast destination IP address. The message is then sent to peer devices (Block 330) before the example method returns (Node 390).

Referring back to event branch point 310, referring to the right branch of the example method 300, in response to receiving a fault detection protocol (e.g., BFD-compliant) message (packet), the example method 300 determines whether the message includes both (1) a multicast MAC address and (2) a multicast IP address. (Decision 350) If so (Decision 350, YES), the example method 300 identifies the message as a fault detection (e.g., BFD) on a multihomed LAG message (Block 360) and processes the message accordingly (Block 370) before the method returns (Node 390). If, on the other hand, the message does not include both (1) a multicast MAC address and (2) a multicast IP address (Decision 350, NO), the example method 300 processes the message otherwise (e.g., in a conventional manner) (Block 380) before the example method 300 returns (Node 390). Note that in any protocol definition, there would be clear guidelines on how to identify a particular control packet. The MAC and IP destination addresses are checked to classify the message (e.g., packets) to avoid any ambiguity in differentiating between "regular" and "multihomed" fault detection.

As can be appreciated from the foregoing, in the context of BFD, when a BFD packet arrives, the destination MAC address (e.g., of 01-00-5E-90-00-01) indicates it is BFD on LAG (e.g., compliant with RFC 7130) and the multicast destination IP address further classifies it into a multihomed LAG bundle. UDP and BFD parameters could remain unchanged as per the RFC 7130 definition.

Referring back to block 320, in the context of BFD, the BFD on multihomed LAG message may be formatted, for example, as described in with reference to FIGS. 4 and 5 in § 4.2 below.

§ 4.2 Example Data Structure(S)

Figure 4:
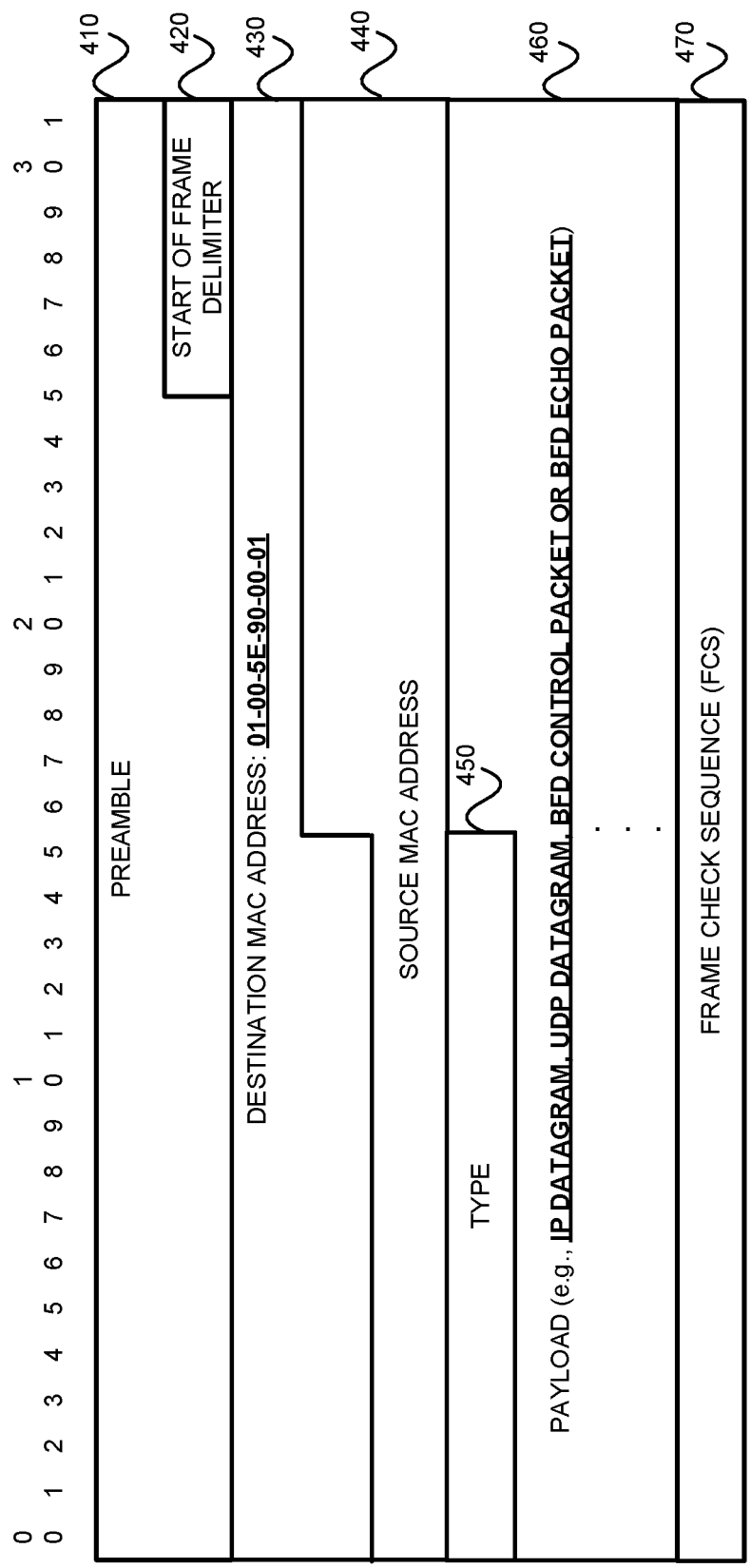
FIG. 4 is an example Ethernet frame which may be used as a BFD on multi-homed LAG message consistent with the present description.
Figure 5:
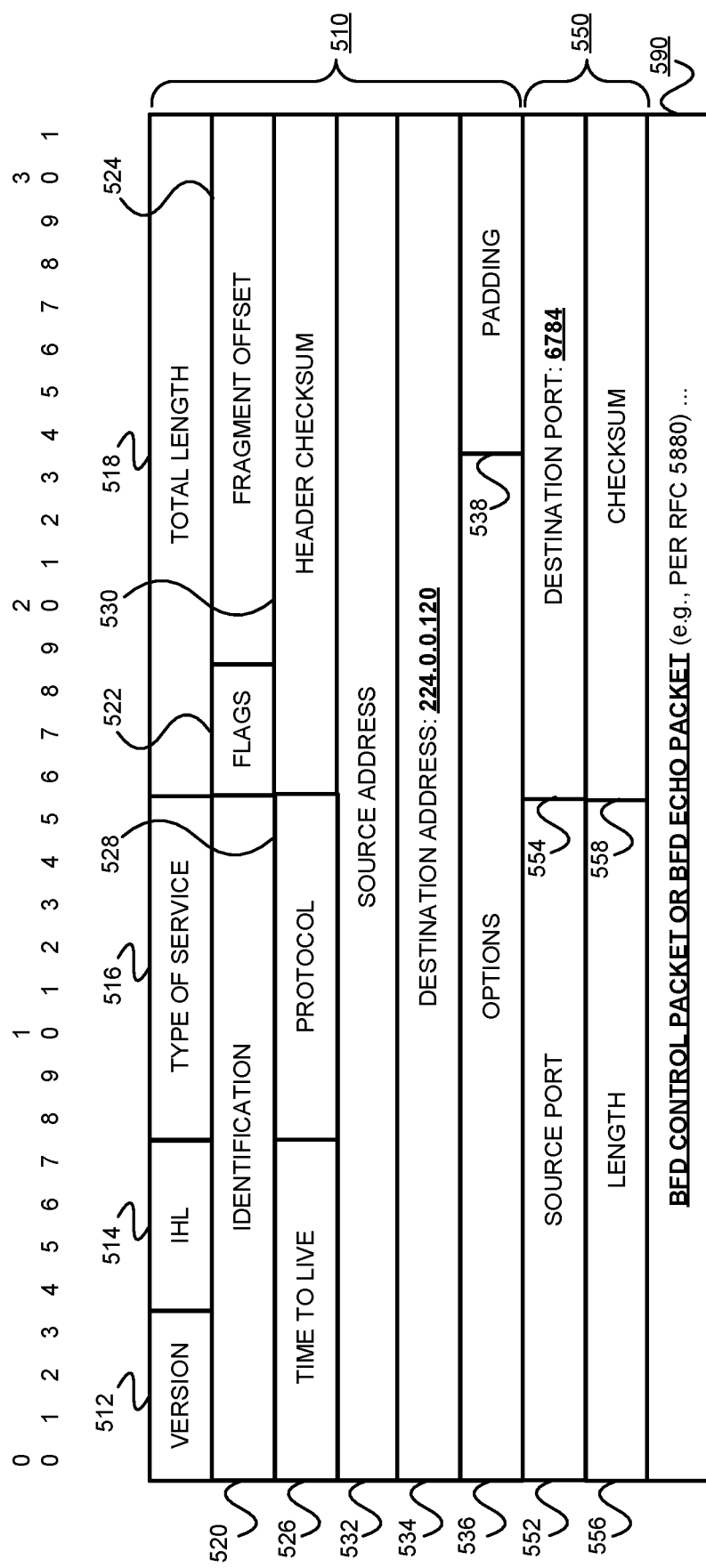
FIG. 5 is an example Ethernet payload including an IP datagram, a UDP datagram and a BFD control packet or BFD echo packet.

FIG. 4 is an example Ethernet frame 400 which may be used as the BFD on multi-homed LAG message. As shown, the example Ethernet frame 400 may include a 58-bit preamble 410, a 6-bit start of frame delimiter field 420, a 48-bit destination MAC address field 430, a 48-bit source MAC address field 440, a 16-bit type field 450, payload 460, and a 32-bit frame check sequence (FCS) field 470.

Referring back to field 430, the 48-bit destination MAC address may be set to 01-00-5E-90-00-01. This destination MAC address is specified in § 2.3 of RFC 7130.

The payload 460 may include an IP datagram including a UDP datagram, with the UDP datagram including a BFD control packet or BFD echo packet. An example payload 460' is now described with reference to FIG. 5. The example payload 460' basically includes an IP datagram 510, a UDP datagram 550 and a BFD control packet or BFD echo packet (e.g., per RFC 5880) 590.

As shown, the IP datagram 510 may include a 4-bit version field 512, a four bit internet header length (IHL) field 514, an 8-bit type of service field 516, a 16-bit total length field 518, a 16-bit identification field 520, a 3-bit flags field 522, a 13-bit fragment offset field 524, an 8-bit time to live (TTL) field 526, an 8-bit protocol field 528, a 16-bit header checksum field 530, a 32-bit source address field 532, a 32-bit destination address field 534, a 24-bit options field 536 and an 8-bit padding field 538.

Referring back to field 534, the destination address field may carry address value 224.0.0.120. It may be some other multicast address instead, though preferably one available (not otherwise reserved) per the Internet Assigned Numbers Authority (IANA). Using a multicast destination IP address supports BFD on a multihomed environment by ensuring that the destination IP address used to send the BFD packet will be accepted even without being configured on the peer node.

Referring back to field 532, it may be advisable to have the source IP address be the logical IP address attached to chassis or host.

The UDP datagram 550 may include a 16-bit source port field 552, a 16-bit destination port field 554, a 16-bit length field 556 and a 16-bit checksum field 558. Referring back to field 554, the destination port may be set to 6784 per § 2.2 of RFC 7130.

Referring back to decision 350 of the example method 300 of FIG. 3, the multicast destination IP address (e.g., 224.0.0.120) permits the node to understand that the message is for a multihomed LAG bundle, and the multicast MAC address (e.g., 01-00-5E-90-00-01) is compliant with RFC 7130. These two multicast address permit a node to accept and identify a protocol (e.g., BFD) message on multihomed LAG. This identification and classification can be used to exchange link state information between layer 2 (L2) and layer 3 (L3) protocols.

§ 4.3 Example Apparatus

Figure 6:
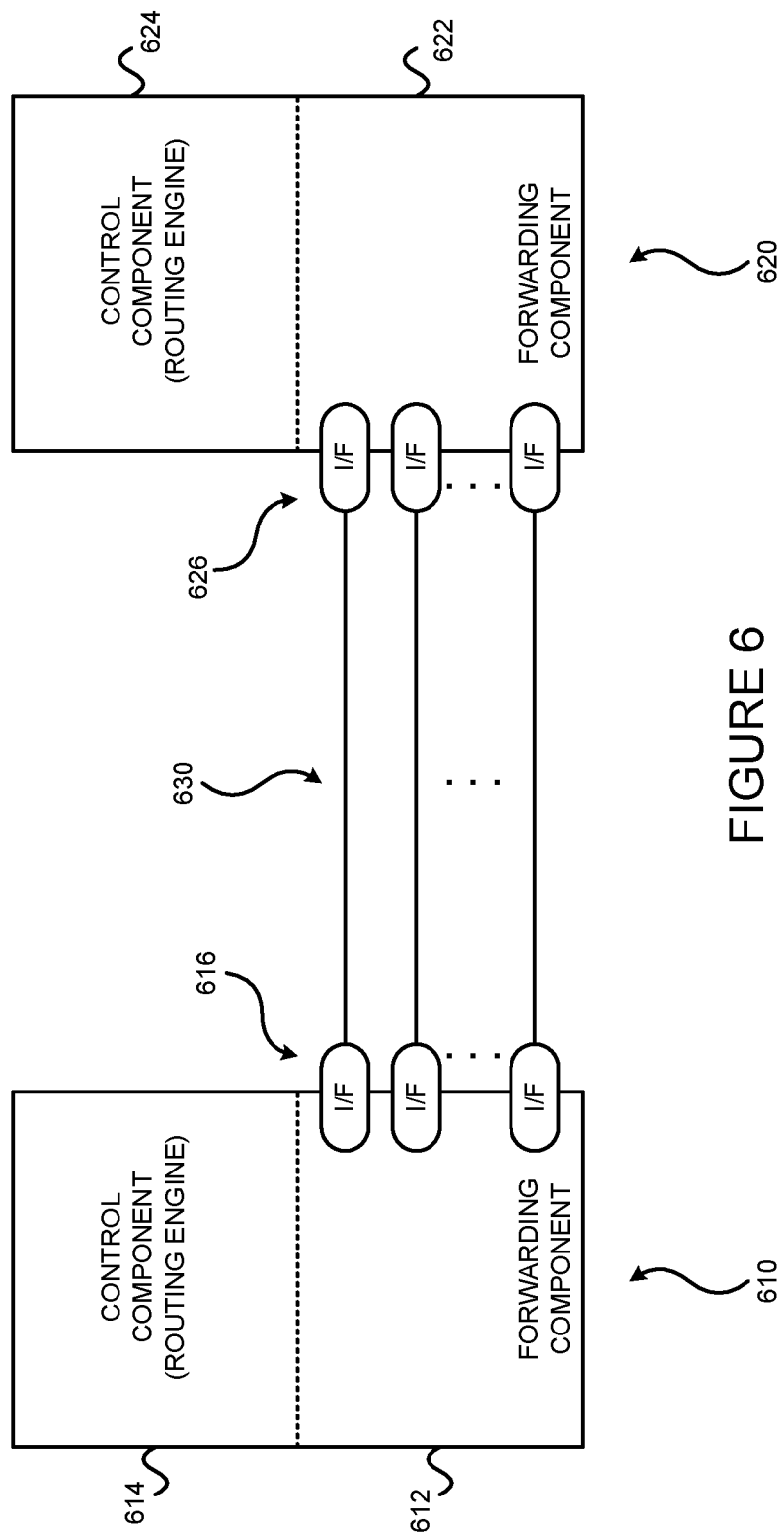
FIG. 6 illustrates an example environment including two systems coupled via communications links.

FIG. 6 illustrates two data forwarding systems 610 and 620 coupled via communications links 630. The links may be physical links or "wireless" links. The data forwarding systems 610,620 may be nodes, such as routers for example. If the data forwarding systems 610,620 are example routers, each may include a control component (e.g., a routing engine) 614,624 and a forwarding component 612,622. Each data forwarding system 610,620 includes one or more interfaces 616,626 that terminate one or more communications links 630. Any two of the label switched routers (LSRs) may be implemented on device 610 and/or 620. The example method 300 described above may be implemented in the control component 614 and/or 624 of device 610 and/or 620.

As just discussed above, and referring to FIG. 7, some example routers 700 include a control component (e.g., routing engine) 710 and a packet forwarding component (e.g., a packet forwarding engine) 790.

The control component 710 may include an operating system (OS) kernel 720, routing protocol process(es) 730, label-based forwarding protocol process(es) 740, interface process(es) 750, user interface (e.g., command line interface) process(es) 760, and chassis process(es) 770, and may store routing table(s) 739, label forwarding information 745, and forwarding (e.g., route-based and/or label-based) table(s) 780. As shown, the routing protocol process(es) 730 may support routing protocols such as the routing information protocol ("RIP") 731, the intermediate system-to-intermediate system protocol ("IS-IS") 732, the open shortest path first protocol ("OSPF") 733, the enhanced interior gateway routing protocol ("EIGRP") 734 and the border gateway protocol ("BGP") 735, and the label-based forwarding protocol process(es) 740 may support protocols such as BGP 735, the label distribution protocol ("LDP") 736 and the resource reservation protocol ("RSVP") 737. The routing protocol process(es) 730 (or associated processes for teaching resulting routes) may implement the example method 300 of FIG. 3. One or more components (not shown) may permit a user 765 to interact with the user interface process(es) 760. Similarly, one or more components (not shown) may permit an outside device to interact with one or more of the router protocol process(es) 730, the label-based forwarding protocol process(es) 740, the interface process(es) 750, and the chassis process(es) 770, via SNMP 785, and such processes may send information to an outside device via SNMP 785.

The packet forwarding component 790 may include a microkernel 792, interface process(es) 793, distributed ASICs 794, chassis process(es) 795 and forwarding (e.g., route-based and/or label-based) table(s) 796.

Figure 7:
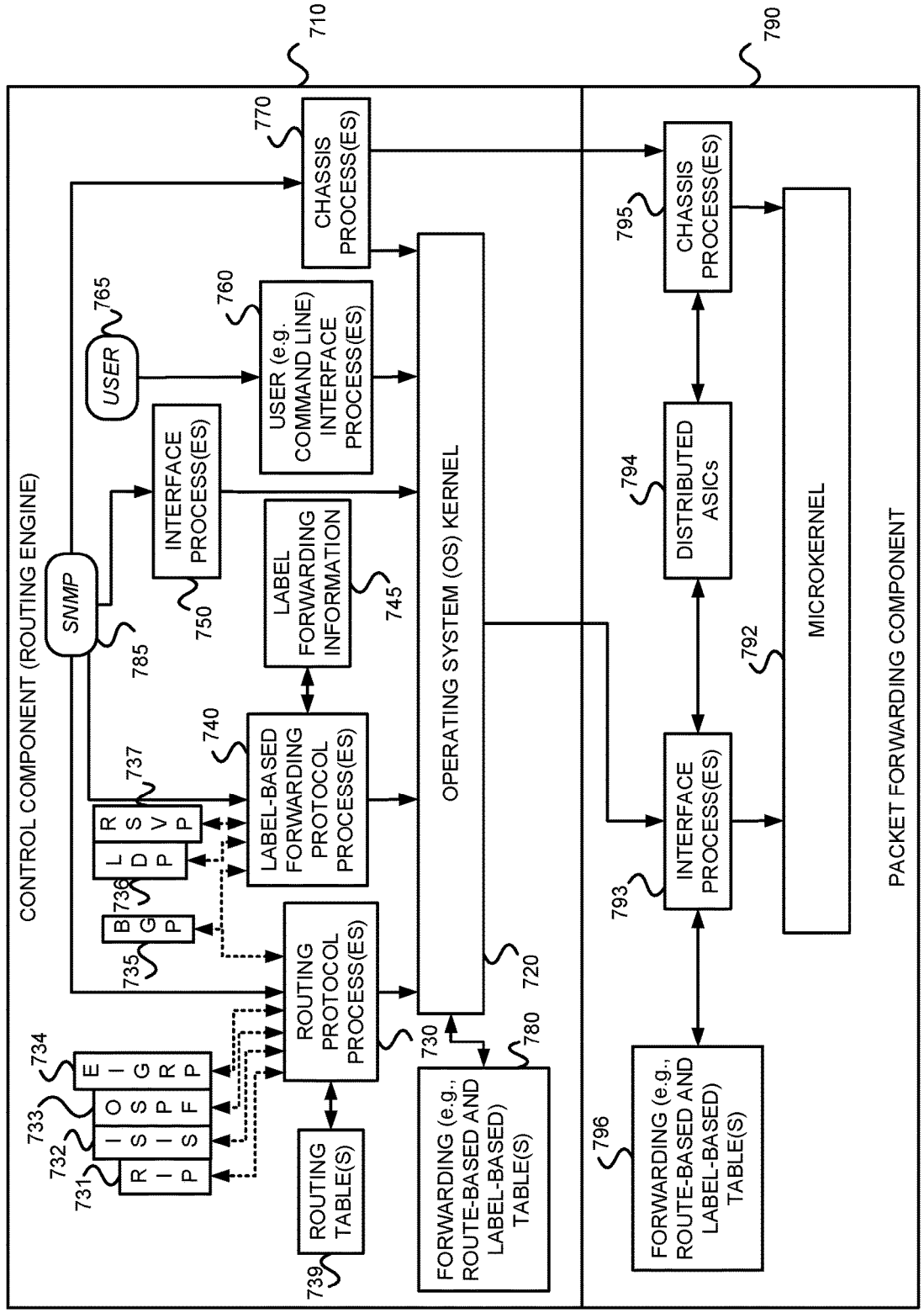
FIG. 7 is a block diagram of an example router on which the example methods of the present description may be implemented.

In the example router 700 of FIG. 7, the control component 710 handles tasks such as performing routing protocols, performing label-based forwarding protocols, control packet processing, etc., which frees the packet forwarding component 790 to forward received packets quickly. That is, received control packets (e.g., routing protocol packets and/or label-based forwarding protocol packets) are not fully processed on the packet forwarding component 790 itself, but are passed to the control component 710, thereby reducing the amount of work that the packet forwarding component 790 has to do and freeing it to process packets to be forwarded efficiently. Thus, the control component 710 is primarily responsible for running routing protocols and/or label-based forwarding protocols, maintaining the routing tables and/or label forwarding information, sending forwarding table updates to the packet forwarding component 790, and performing system management. The example control component 710 may handle routing protocol packets, provide a management interface, provide configuration management, perform accounting, and provide alarms. The processes 730, 740, 750, 760 and 770 may be modular, and may interact with the OS kernel 720. That is, nearly all of the processes communicate directly with the OS kernel 720. Using modular software that cleanly separates processes from each other isolates problems of a given process so that such problems do not impact other processes that may be running. Additionally, using modular software facilitates easier scaling.

Still referring to FIG. 7, the example OS kernel 720 may incorporate an application programming interface ("API") system for external program calls and scripting capabilities. The control component 710 may be based on an Intel PCI platform running the OS from flash memory, with an alternate copy stored on the router's hard disk. The OS kernel 720 is layered on the Intel PCI platform and establishes communication between the Intel PCI platform and processes of the control component 710. The OS kernel 720 also ensures that the forwarding tables 796 in use by the packet forwarding component 790 are in sync with those 780 in the control component 710. Thus, in addition to providing the underlying infrastructure to control component 710 software processes, the OS kernel 720 also provides a link between the control component 710 and the packet forwarding component 790.

Referring to the routing protocol process(es) 730 of FIG. 7, this process(es) 730 provides routing and routing control functions within the platform. In this example, the RIP 731, ISIS 732, OSPF 733 and EIGRP 734 (and BGP 735) protocols are provided. Naturally, other routing protocols may be provided in addition, or alternatively. Similarly, the label-based forwarding protocol process(es) 740 provides label forwarding and label control functions. In this example, the LDP 736 and RSVP 737 (and BGP 735) protocols are provided. Naturally, other label-based forwarding protocols (e.g., MPLS) may be provided in addition, or alternatively. In the example router 700, the routing table(s) 739 is produced by the routing protocol process(es) 730, while the label forwarding information 745 is produced by the label-based forwarding protocol process(es) 740.

Still referring to FIG. 7, the interface process(es) 750 performs configuration of the physical interfaces (Recall, e.g., 716 and 726 of FIG. 7) and encapsulation. In the example router 700, the example method 300 consistent with the present disclosure may be implemented in the control component 710, in the routing protocol processes 730.

The example control component 710 may provide several ways to manage the router (e.g., for configuring the interval as discussed with reference to block 305 of FIG. 3). For example, it 710 may provide a user interface process(es) 760 which allows a system operator 765 to interact with the system through configuration, modifications, and monitoring. The SNMP 785 allows SNMP-capable systems to communicate with the router platform. This also allows the platform to provide necessary SNMP information to external agents. For example, the SNMP 785 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 710, thereby avoiding slowing traffic forwarding by the packet forwarding component 790.

Although not shown, the example router 700 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 760 via a console port, an auxiliary port, and/or a management Ethernet port. As noted, the interval may be configured using the CLI.

The packet forwarding component 790 is responsible for properly outputting received packets as quickly as possible. If there is no entry in the forwarding table for a given destination or a given label and the packet forwarding component 790 cannot perform forwarding by itself, it 790 may send the packets bound for that unknown destination off to the control component 710 for processing. The example packet forwarding component 790 is designed to perform Layer 2 and Layer 3 switching, route lookups, and rapid packet forwarding.

As shown in FIG. 7, the example packet forwarding component 790 has an embedded microkernel 792, interface process(es) 793, distributed ASICs 794, and chassis process(es) 795, and stores a forwarding (e.g., route-based and/or label-based) table(s) 796. The microkernel 792 interacts with the interface process(es) 793 and the chassis process(es) 795 to monitor and control these functions. The interface process(es) 792 has direct communication with the OS kernel 720 of the control component 710. This communication includes forwarding exception packets and control packets to the control component 710, receiving packets to be forwarded, receiving forwarding table updates, providing information about the health of the packet forwarding component 790 to the control component 710, and permitting configuration of the interfaces from the user interface (e.g., CLI) process(es) 760 of the control component 710. The stored forwarding table(s) 796 is static until a new one is received from the control component 710. The interface process(es) 793 uses the forwarding table(s) 796 to look up next-hop information. The interface process(es) 793 also has direct communication with the distributed ASICs 794. Finally, the chassis process(es) 795 may communicate directly with the microkernel 792 and with the distributed ASICs 794.

Figure 8:
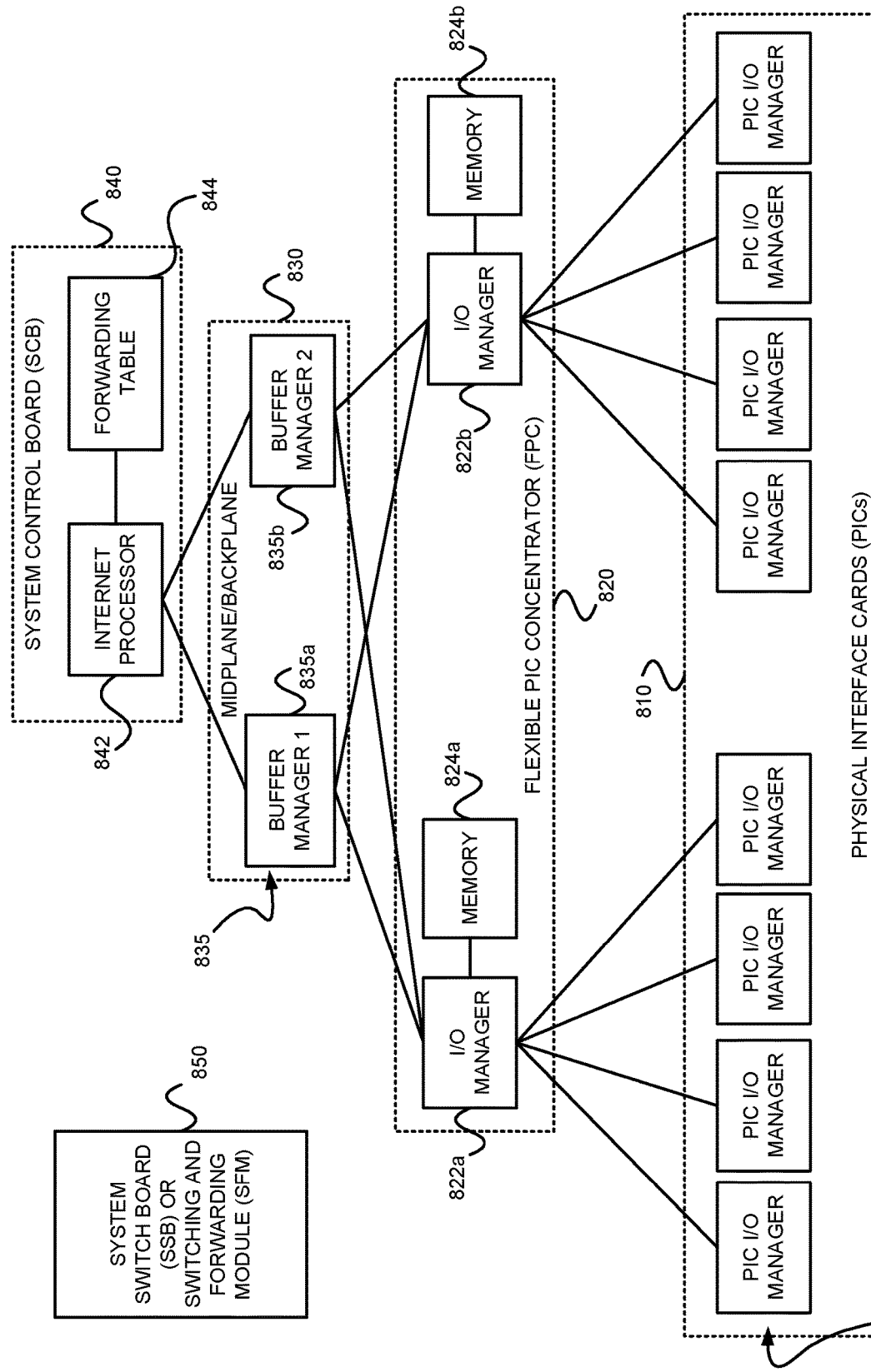
FIG. 8 is a block diagram of example distributed application specific integrated circuits ("ASICs") that may be provided in the example router of FIG. 8.

Referring back to distributed ASICs 794 of FIG. 7, FIG. 8 is an example of how the ASICS may be distributed in the packet forwarding component 790 to divide the responsibility of packet forwarding. As shown in FIG. 8, the ASICs of the packet forwarding component 790 may be distributed on physical interface cards ("PICs") 810, flexible PIC concentrators ("FPCs") 820, a midplane or backplane 830, and a system control board(s) 840 (for switching and/or forwarding). Switching fabric is also shown as a system switch board ("SSB"), or a switching and forwarding module ("SFM") 850. Each of the PICs 810 includes one or more PIC I/O managers 815. Each of the FPCs 820 includes one or more I/O managers 822, each with an associated memory 824. The midplane/backplane 830 includes buffer managers 835a, 835b. Finally, the system control board 840 includes an Internet processor 842 and an instance of the forwarding table 844 (Recall, e.g., 796 of FIG. 7).

Still referring to FIG. 8, the PICs 810 contain the interface ports. Each PIC 810 may be plugged into an FPC 820. Each individual PIC 810 may contain an ASIC that handles media-specific functions, such as framing or encapsulation. Some example PICs 810 provide SDH/SONET, ATM, Gigabit Ethernet, Fast Ethernet, and/or DS3/E3 interface ports.

An FPC 820 can contain from one or more PICs 810, and may carry the signals from the PICs 810 to the midplane/backplane 830 as shown in FIG. 8.

The midplane/backplane 830 holds the line cards. The line cards may connect into the midplane/backplane 830 when inserted into the example router's chassis from the front. The control component (e.g., routing engine) 710 may plug into the rear of the midplane/backplane 830 from the rear of the chassis. The midplane/backplane 830 may carry electrical (or optical) signals and power to each line card and to the control component 710.

The system control board 840 may perform forwarding lookup. It 840 may also communicate errors to the routing engine. Further, it 840 may also monitor the condition of the router based on information it receives from sensors. If an abnormal condition is detected, the system control board 840 may immediately notify the control component 710.

Figure 9A:
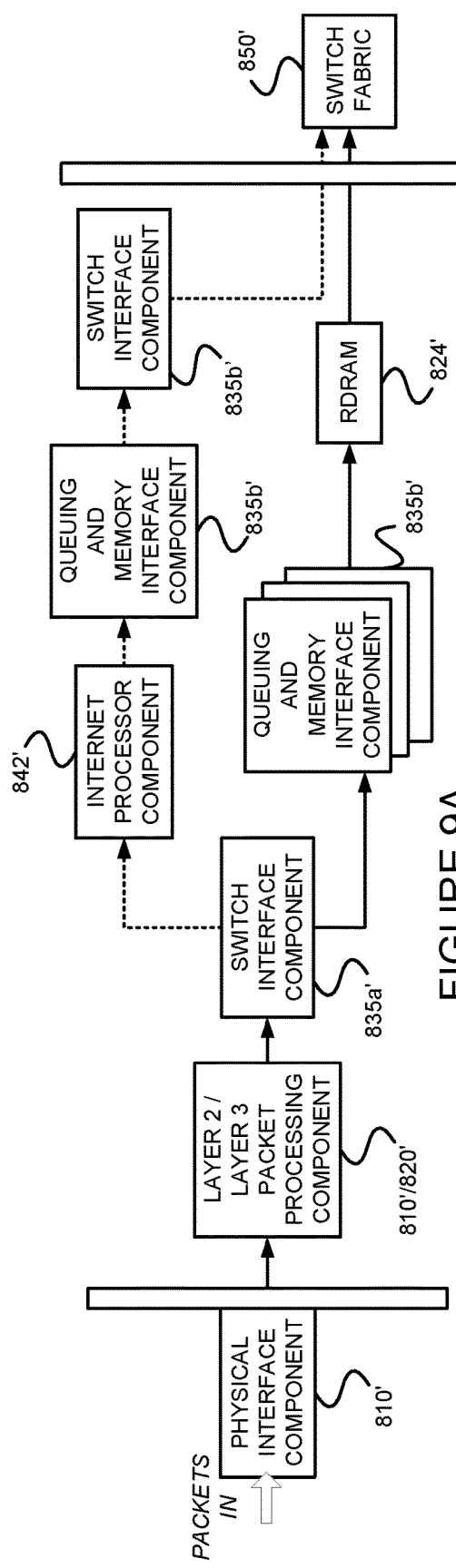
FIGS. 9A and 9B illustrate example packet forwarding operations of the example distributed ASICs of FIG. 8.
Figure 9B:
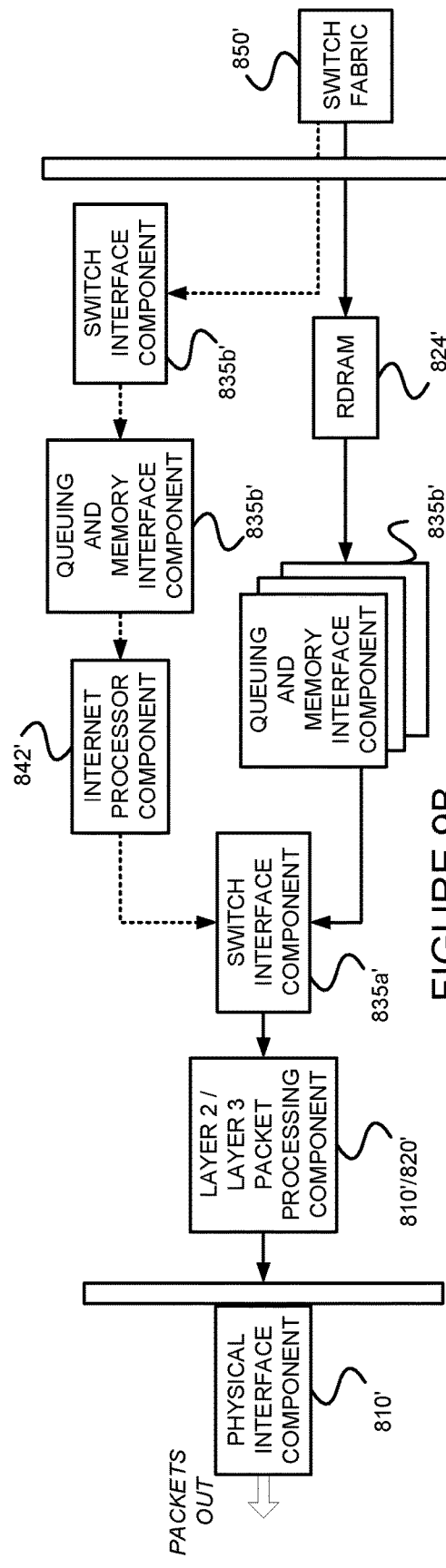

Referring to FIGS. 8, 9A and 9B, in some exemplary routers, each of the PICs 810,710' contains at least one I/O manager ASIC 815 responsible for media-specific tasks, such as encapsulation. The packets pass through these I/O ASICs on their way into and out of the router. The I/O manager ASIC 815 on the PIC 810,710' is responsible for managing the connection to the I/O manager ASIC 822 on the FPC 820,720', managing link-layer framing and creating the bit stream, performing cyclical redundancy checks (CRCs), and detecting link-layer errors and generating alarms, when appropriate. The FPC 820 includes another I/O manager ASIC 822. This ASIC 822 takes the packets from the PICs 810 and breaks them into (e.g., 64-byte) memory blocks. This FPC I/O manager ASIC 822 sends the blocks to a first distributed buffer manager (DBM) 835*a*', decoding encapsulation and protocol-specific information, counting packets and bytes for each logical circuit, verifying packet integrity, and applying class of service (CoS) rules to packets. At this point, the packet is first written to memory. More specifically, the example DBM ASIC 835*a*' manages and writes packets to the shared memory 824 across all FPCs 820. In parallel, the first DBM ASIC 835*a*' also extracts information on the destination of the packet and passes this forwarding-related information to the Internet processor 842/742'. The Internet processor 842/742' performs the route lookup using the forwarding table 844 and sends the information over to a second DBM ASIC 835*b*'. The Internet processor ASIC 842/742' also collects exception packets (i.e., those without a forwarding table entry) and sends them to the control component 710. The second DBM ASIC 835*b*' then takes this information and the 64-byte blocks and forwards them to the I/O manager ASIC 822 of the egress FPC 820/720' (or multiple egress FPCs, in the case of multicast) for reassembly. (Thus, the DBM ASICs 835*a*' and 835*b*' are responsible for managing the packet memory 824 distributed across all FPCs 820/720', extracting forwarding-related information from packets, and instructing the FPC where to forward packets.)

The I/O manager ASIC 822 on the egress FPC 820/720' may perform some value-added services. In addition to incrementing time to live ("TTL") values and re-encapsulating the packet for handling by the PIC 810, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 822 on the egress FPC 820/720' may be responsible for receiving the blocks from the second DBM ASIC 835*b*', incrementing TTL values, queuing a pointer to the packet, if necessary, before applying CoS rules, re-encapsulating the blocks, and sending the encapsulated packets to the PIC I/O manager ASIC 815.

Figure 10:
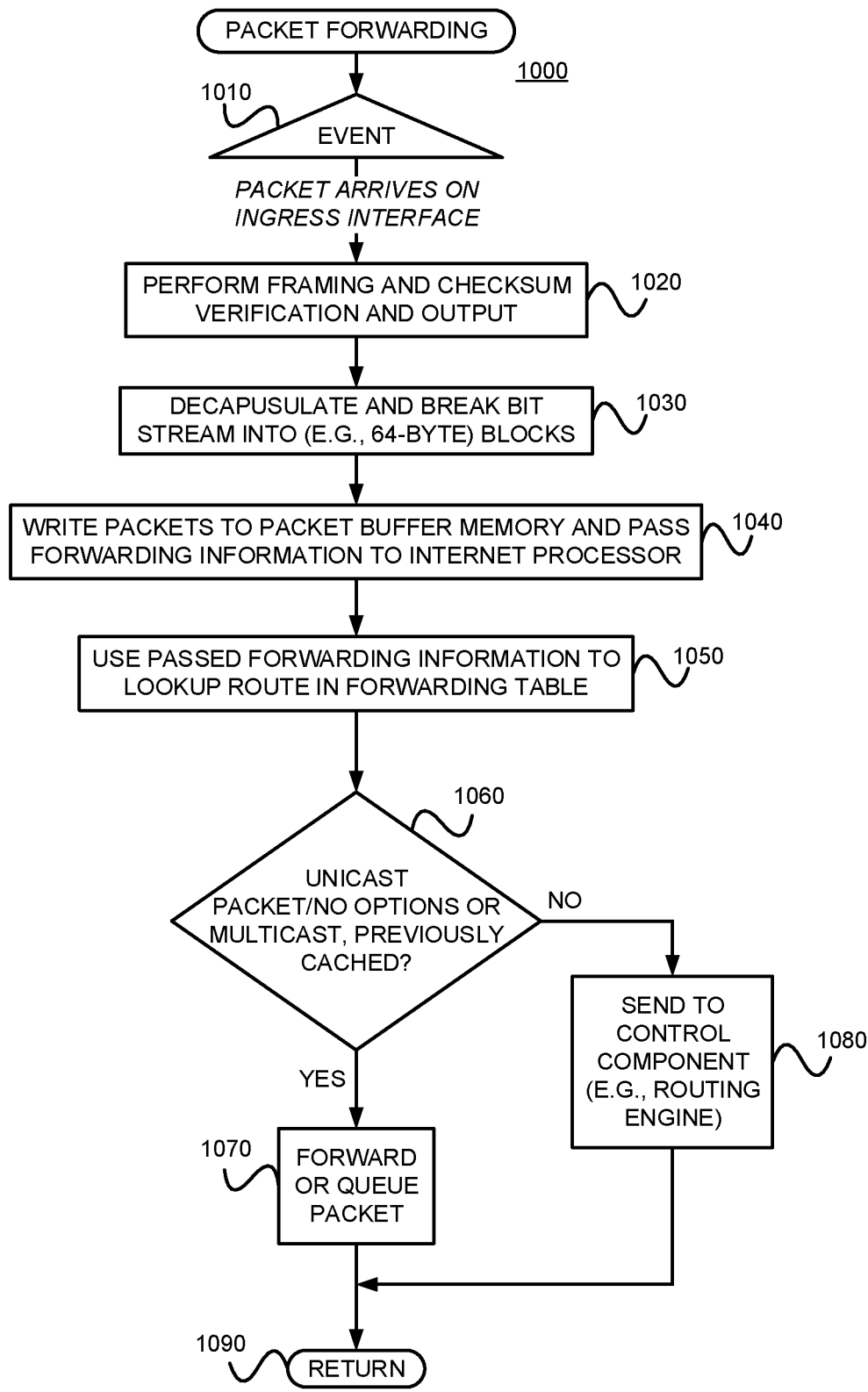
FIG. 10 is a flow diagram of an example packet forwarding method that may be implemented on any of the example routers of FIGS. 9 and 10.

FIG. 10 is a flow diagram of an example method 1000 for providing packet forwarding in the example router. The main acts of the method 1000 are triggered when a packet is received on an ingress (incoming) port or interface. (Event 1010) The types of checksum and frame checks that are required by the type of medium it serves are performed and the packet is output, as a serial bit stream. (Block 1020) The packet is then decapsulated and parsed into (e.g., 64-byte) blocks. (Block 1030) The packets are written to buffer memory and the forwarding information is passed on the Internet processor. (Block 1040) The passed forwarding information is then used to lookup a route in the forwarding table. (Block 1050) (Recall, e.g., FIGS. 8A-8D.) Note that the forwarding table can typically handle unicast packets that do not have options (e.g., accounting) set, and multicast packets for which it already has a cached entry. Thus, if it is determined that these conditions are met (YES branch of Decision 1060), the packet forwarding component finds the next hop and egress interface, and the packet is forwarded (or queued for forwarding) to the next hop via the egress interface (Block 1070) before the method 1000 is left (Node 1090) Otherwise, if these conditions are not met (NO branch of Decision 1060), the forwarding information is sent to the control component 710 for advanced forwarding resolution (Block 1080) before the method 1000 is left (Node 1090).

Referring back to block 1070, the packet may be queued. Actually, as stated earlier with reference to FIG. 8, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 822 may send a request for the packet to the second DBM ASIC 835*b*. The DBM ASIC 835 reads the blocks from shared memory and sends them to the I/O manager ASIC 822 on the FPC 820, which then serializes the bits and sends them to the media-specific ASIC of the egress interface. The I/O manager ASIC 815 on the egress PIC 810 may apply the physical-layer framing, perform the CRC, and send the bit stream out over the link.

Referring back to block 1080 of FIG. 10, as well as FIG. 8, regarding the transfer of control and exception packets, the system control board 840 handles nearly all exception packets. For example, the system control board 840 may pass exception packets to the control component 710.

Although example embodiments consistent with the present disclosure may be implemented on the example routers of FIG. 6 or 7, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 1100 as illustrated on FIG. 11.

Figure 11:
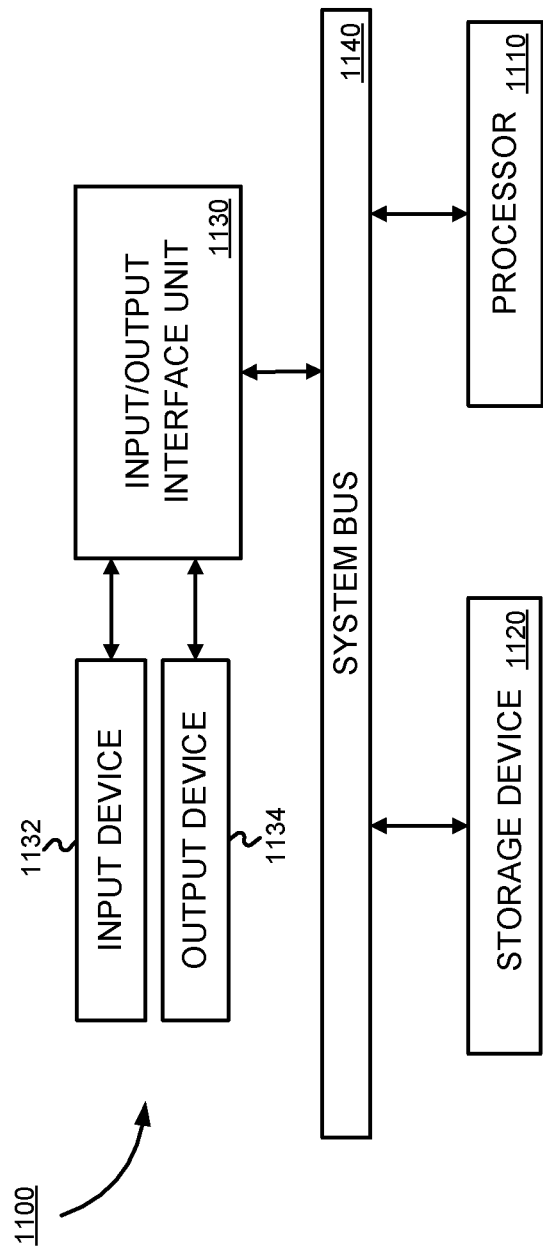
FIG. 11 is a block diagram of an example processor-based system that may be used to execute the example method(s) consistent with the present description.

FIG. 11 is a block diagram of an exemplary machine 1100 that may perform one or more of the methods described, and/or store information used and/or generated by such methods. The exemplary machine 1100 includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130. The one or more processors 1110 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1120 and/or may be received from an external source via one or more input interface units 1130. The machine executable instructions may be stored as various software modules, each module performing one or more operations. Functional software modules are examples of components, which may be used in the apparatus described.

In some embodiments consistent with the present disclosure, the processors 1110 may be one or more microprocessors and/or ASICs. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Refinements, Alternatives and Extensions

Although the example embodiments were described in the context of a data center environment in which a host device is multihomed via two leaf nodes, the use of such example embodiments is not limited to such an environment. That is, example embodiments consistent with the present description may be used in other multihomed architectures, in which a fault detection protocol (e.g., BFD) is run over a LAG.

Although the multicast destination IP address 224.0.0.120 was used to permit the node to understand that the message is for a multihomed LAG bundle, another otherwise unassigned multicast IP address (e.g., 224.0.0.X) may be used instead.

Although the multicast MAC address (e.g., 01-00-5E-90-00-01) was used in order to be compliant with RFC 7130, if another MAC destination address is needed for compliance with some other fault detection protocol or RFC, such a different MAC destination address may be used instead.

Referring back to 550 of FIG. 5, although the destination port was set to 6784 for compliance with RFC 7130, if a different destination port is needed for compliance with some other fault detection protocol or RFC, such a different destination port may be used instead.

Similarly, referring back to 590 of FIG. 5, another fault detection protocol packet can be used instead of a BFD control packet or a BFD echo packet.

§ 4.5 Conclusions

Example embodiments consistent with the present description support a fault detection protocol (e.g., BFD) in a multihomed environment, such as a multihomed LAG for example, by ensuring that the destination address, which is used to send a fault detection protocol packet, is accepted even without being configured on the peering nodes. Since the fault detection protocol packet would not be directed to particular destination address, it is important to use an appropriate destination MAC address. For example, in the context of BFD, the same dedicated MAC address (i.e., 01-00-5E-90-00-01) as defined in RFC 7130 may be used. Using a multicast reserved destination MAC address would be in line with a destination MAC where the multicast bit is set. Using a reserved multicast IP destination address and a reserved multicast MAC destination address allows a multihomed host node (or some other multihomed node, such as a customer edge (CE) node for example) to send fault detection protocol packets to different connected leaf nodes (or some other nodes, such as provider edge (PE) nodes for example).

Upon receiving such a fault detection packet, a node (e.g., a leaf node) should process the packet normally, without checking the source IP address. For example, in the context of BFD, this is because RFC 5581 explicitly mentions that on a point-to-point interface, the source IP address of incoming BFD packet should not be tied with any BFD session. That is, in most implementations, BFD packets could be checked for source address and compared with the configured peer address. If the addresses don't match, then the packet(s) would be discarded.

The example embodiments consistent with the present description allow fault detection protocol (e.g., BFD) session establishment on multihomed environment with directly connected interfaces, such as between a host node and data center leaf nodes.

What is claimed is:

1. For use in a system including a first data forwarding device, a second data forwarding device, a third data forwarding device, a first communications link between the first data forwarding device and the second data forwarding device, and a second communications link between the first data forwarding device and the third data forwarding device, the first and second communications links belonging to a link aggregation group (LAG), a computer implemented method comprising:
    a) generating a message
        i) for testing (1) a first path between the first data forwarding device and the second data forwarding device, and (2) a second path between the first data forwarding device and the third data forwarding device, and
        ii) including a payload containing path testing information;
    b) sending, over the LAG, the message from the first data forwarding device to both the second data forwarding device and the third data forwarding device;
    c) receiving, by the second data forwarding device, an instance of the message;
    d) responsive to receiving the instance of the message by the second data forwarding device, either
        (A) (1) checking, with the second data forwarding device, the instance of the message for compliance with a path testing procedure, and (2) responsive to determining that the instance of the message is compliant with the path testing procedure, processing, with the second data forwarding device, the instance of the message in accordance with the path testing procedure and otherwise, responsive to determining that the instance of the message is not compliant with the path testing procedure, dropping by the second data forwarding device, the instance of the message, or (B) (1) determining, by the second data forwarding device, whether or not the instance of the message is a fault detection on a multihomed link aggregation group message, and (2) processing, by the second data forwarding device, the instance of the message based on the determination of whether or not it is the fault detection on a multihomed link aggregation group message;

e) receiving, by the third data forwarding device, another instance of the message; and f) responsive to receiving the other instance of the message by the third data forwarding device, either (A) (1) checking, with the third data forwarding device, the other instance of the message for compliance with a path testing procedure, and (2) responsive to determining that the other instance of the message is compliant with the path testing procedure, processing, with the third data forwarding device, the other instance of the message in accordance with the path testing procedure and otherwise, responsive to determining that the other instance of the message is not compliant with the path testing procedure, dropping by the third data forwarding device, the other instance of the message, or (B) (1) determining, by the third data forwarding device, whether or not the other instance of the message is a fault detection on a multihomed link aggregation group message, and (2) processing, by the third data forwarding device, the other instance of the message based on the determination of whether or not it is the fault detection on a multihomed link aggregation group message.

2. The computer-implemented method of claim 1 wherein the message includes a multicast Internet Protocol (IP) destination address and wherein the message is carried in an Ethernet frame.

3. The computer-implemented method of claim 2 wherein the Ethernet frame includes a multicast destination media access control (MAC) address.

4. The computer-implemented method of claim 3 wherein the multicast destination MAC address is 01-00-5E-90-00-01.

5. The computer-implemented method of claim 1 wherein the path testing information in the payload of the message includes at least one of (A) a bidirectional forwarding detection (BFD) control packet compliant with the "Bidirectional Forwarding Detection (BFD)," Request for Comments (RFC) 5880 issued June 2010 or (B) a BFD echo packet compliant with RFC 5880.

6. The computer-implemented method of claim 5 wherein the path testing information in the payload of the message includes at least one of (A) a bidirectional forwarding detection (BFD) control packet compliant with the "Bidirectional Forwarding Detection (BFD) on Link Aggregation Group (LAG) Interfaces," Request for Comments (RFC) 7130, from the Internet Engineering Task Force, issued February 2014 or (B) a BFD echo packet compliant with RFC 7130.

7. The computer-implemented method of claim 1, wherein responsive to determining that the message is compliant with the path testing procedure, processing by the second and third data forwarding devices, the message in accordance with the path testing procedure and otherwise, responsive to determining that the message is not compliant with the path testing procedure, dropping by the second and third data forwarding devices, the message.

8. The computer-implemented method of claim 7 wherein the act of testing the message for compliance with the path testing procedure includes checking a destination IP address of the message.

9. The computer-implemented method of claim 7 wherein the path testing information in the payload of the message includes at least one of (A) a bidirectional forwarding detection (BFD) control packet compliant with the "Bidirectional Forwarding Detection (BFD)," Request for Comments (RFC) 5880 from the Internet Engineering Task Force issued June 2010 or (B) a BFD echo packet compliant with RFC 5880, and wherein the path testing procedure is bidirectional forwarding detection in accordance with RFC 5880.

10. The computer-implemented method of claim 7 wherein the path testing information in the payload of the message includes at least one of (A) a bidirectional forwarding detection (BFD) control packet compliant with the "Bidirectional Forwarding Detection (BFD)," Request for Comments (RFC) 5880 from the Internet Engineering Task Force issued June 2010 or (B) a BFD echo packet compliant with RFC 5880, and wherein the path testing procedure is bidirectional forwarding detection in accordance with the "Bidirectional Forwarding Detection (BFD) on Link Aggregation Group (LAG) Interfaces," Request for Comments (RFC) 7130, from the Internet Engineering Task Force, issued February 2014.

11. The computer-implemented method of claim 1 wherein, responsive to receiving the instance of the message by the second data forwarding device, 1) determining, by the second data forwarding device, whether or not the instance of the message is a fault detection on a multihomed link aggregation group message, and 2) processing, by the second data forwarding device, the instance of the message based on the determination of whether or not it is the fault detection on a multihomed link aggregation group message, and responsive to receiving the other instance of the message by the third data forwarding device, 1) determining, by the third data forwarding device, whether or not the other instance of the message is a fault detection on a multihomed link aggregation group message, and 2) processing, by the third data forwarding device, the other instance of the message based on the determination of whether or not it is the fault detection on a multihomed link aggregation group message.

12. A system comprising:

a) a first data forwarding device;

b) a second data forwarding device;

c) a third data forwarding device;

d) a first communications link between the first data forwarding device and the second data forwarding device; and e) a second communications link between the first data forwarding device and the third data forwarding device, wherein the first and second communications links belonging to a link aggregation group (LAG), wherein the first data forwarding device is configured to generate a message i) for testing (1) a first path between the first data forwarding device and the second data forwarding device, and (2) a second path between the first data forwarding device and the third data forwarding device, and ii) including a payload containing path testing information, send, over the LAG, an instance of the message to the second data forwarding device, and send, over the LAG, another instance of the message to the third data forwarding device, wherein the second data forwarding device is configured to receive the instance of the message, and responsive to receiving the instance of the message, either (A) (1) check the instance of the message for compliance with a path testing procedure, and (2) responsive to determining that the instance of the message is compliant with the path testing procedure, process the instance of the message in accordance with the path testing procedure and otherwise, responsive to determining that the instance of the message is not compliant with the path testing procedure, drop the instance of the message, or (B) (1) determine whether or not the instance of the message is a fault detection on a multihomed link aggregation group message, and (2) process the instance of the message based on the determination of whether or not it is the fault detection on a multihomed link aggregation group message, and wherein the third data forwarding device is adapted to receive the other instance of the message, and responsive to receiving the other instance of the message, either (A) (1) check the other instance of the message for compliance with a path testing procedure, and (2) responsive to determining that the other instance of the message is compliant with the path testing procedure, process the other instance of the message in accordance with the path testing procedure and otherwise, responsive to determining that the other instance of the message is not compliant with the path testing procedure, drop the other instance of the message, or (B) (1) determine whether or not the other instance of the message is a fault detection on a multihomed link aggregation group message, and (2) process the other instance of the message based on the determination of whether or not it is the fault detection on a multihomed link aggregation group message.

13. The system of claim 12 wherein the message includes a multicast Internet Protocol (IP) destination address and wherein the message is carried in an Ethernet frame.

14. The system of claim 13 wherein the Ethernet frame includes a multicast destination media access control (MAC) address.

15. The system node of claim 14 wherein the multicast destination MAC address is 01-00-5E-90-00-01.

16. The system of claim 12 wherein the path testing information in the payload of the bidirectional forwarding on multihomed LAG message includes at least one of (A) a bidirectional forwarding detection (BFD) control packet compliant with the "Bidirectional Forwarding Detection (BFD)," Request for Comments (RFC) 5880 from the Internet Engineering Task Force issued June 2010 or (B) a BFD echo packet compliant with RFC 5880.

17. The system of claim 12 wherein the path testing information in the payload of the bidirectional forwarding on multihomed LAG message includes at least one of (A) a bidirectional forwarding detection (BFD) control packet compliant with the "Bidirectional Forwarding Detection (BFD) on Link Aggregation Group (LAG) Interfaces," Request for Comments (RFC) 7130, from the Internet Engineering Task Force, issued February 2014 or (B) a BFD echo packet compliant with RFC 7130.

18. A non-transitory computer-readable medium storing processor executable instructions which, when executed by a least one processor, perform a method for use in a system including a first data forwarding device, a second data forwarding device, a third data forwarding device, a first communications link between the first data forwarding device and the second data forwarding device, and a second communications link between the first data forwarding device and the third data forwarding device, the first and second communications links belonging to a link aggregation group (LAG), the method comprising:

a) generating a message i) for testing (1) a first path between the first data forwarding device and the second data forwarding device, and (2) a second path between the first data forwarding device and the third data forwarding device, and ii) including a payload containing path testing information; and b) sending, over the LAG, the message from the first data forwarding device to both the second data forwarding device and the third data forwarding device;

c) receiving, by the second data forwarding device, an instance of the message;

d) responsive to receiving the instance of the message by the second data forwarding device, either (A) (1) checking, with the second data forwarding device, the instance of the message for compliance with a path testing procedure, and (2) responsive to determining that the instance of the message is compliant with the path testing procedure, processing, with the second data forwarding device, the instance of the message in accordance with the path testing procedure and otherwise, responsive to determining that the instance of the message is not compliant with the path testing procedure, dropping by the second data forwarding device, the instance of the message, or (B) (1) determining, by the second data forwarding device, whether or not the instance of the message is a fault detection on a multihomed link aggregation group message, and (2) processing, by the second data forwarding device, the instance of the message based on the determination of whether or not it is the fault detection on a multihomed link aggregation group message;

e) receiving, by the third data forwarding device, another instance of the message; and f) responsive to receiving the other instance of the message by the third data forwarding device, either (A) (1) checking, with the third data forwarding device, the other instance of the message for compliance with a path testing procedure, and (2) responsive to determining that the other instance of the message is compliant with the path testing procedure, processing, with the third data forwarding device, the other instance of the message in accordance with the path testing procedure and otherwise, responsive to determining that the other instance of the message is not compliant with the path testing procedure, dropping by the third data forwarding device, the other instance of the message, or (B) (1) determining, by the third data forwarding device, whether or not the other instance of the message is a fault detection on a multihomed link aggregation group message, and (2) processing, by the third data forwarding device, the other instance of the message based on the determination of whether or not it is the fault detection on a multihomed link aggregation group message.

19. The non-transitory computer-readable medium of claim 18, wherein responsive to determining that the message is compliant with the path testing procedure, processing by the second and third data forwarding devices, the message in accordance with the path testing procedure and otherwise, responsive to determining that the message is not compliant with the path testing procedure, dropping by the second and third data forwarding devices, the message.

20. The non-transitory computer-readable medium of claim 18, wherein responsive to receiving the instance of the message by the second data forwarding device,
 1) determining whether or not the instance of the message is a fault detection on a multihomed link aggregation group message, and
 2) processing the instance of the message based on the determination of whether or not it is the fault detection on a multihomed link aggregation group message, and responsive to receiving the other instance of the message by the third data forwarding device,
 1) determining whether or not the other instance of the message is a fault detection on a multihomed link aggregation group message, and
 2) processing the other instance of the message based on the determination of whether or not it is the fault detection on a multihomed link aggregation group message.

* * * * *